A. J. CONNELL & C. A. JOHNSON.
DOOR AND LIKE METALLIC STRUCTURE.
APPLICATION FILED JAN. 12, 1915.
1,287,888.
Patented Dec. 17, 1918.
3 SHEETS—SHEET 1.
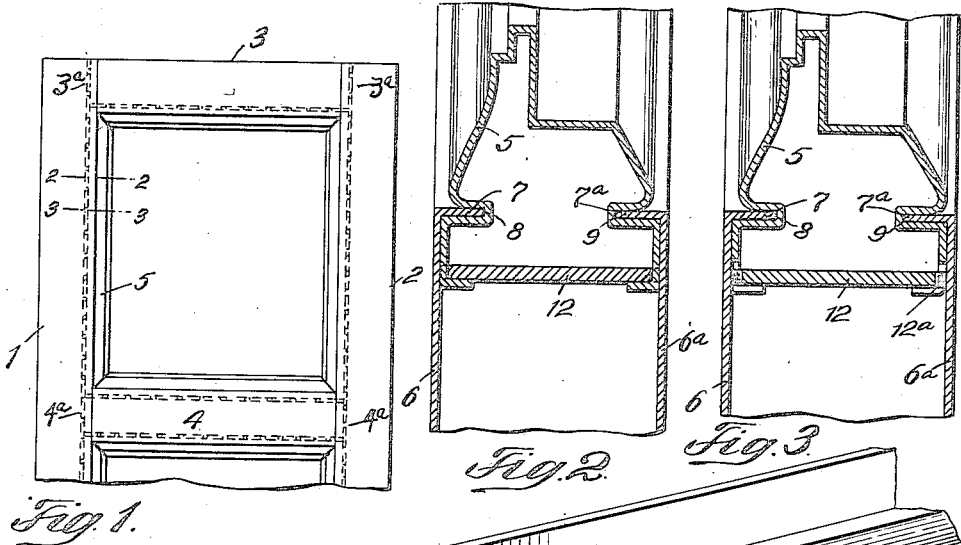
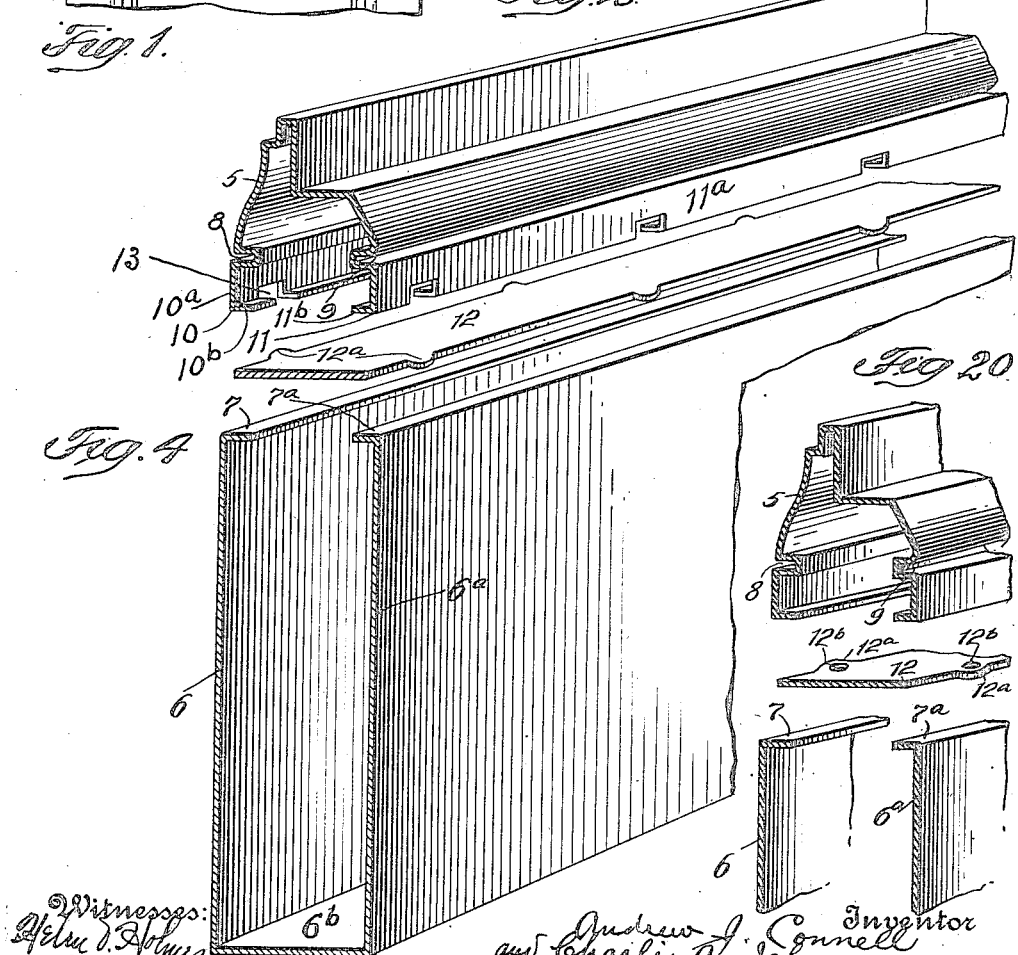

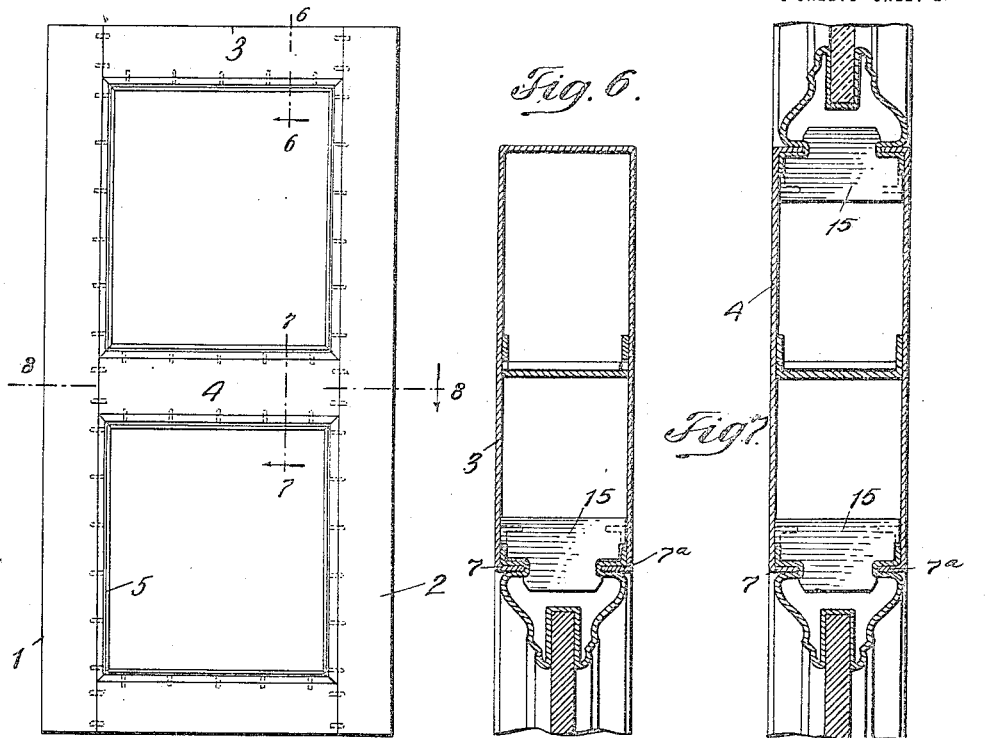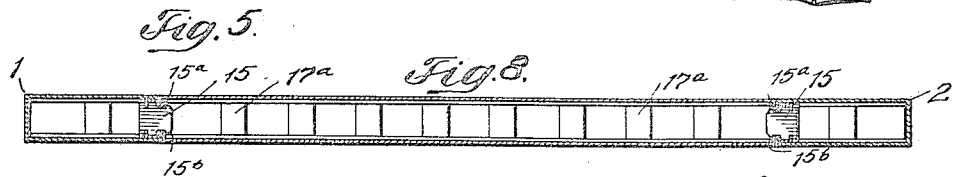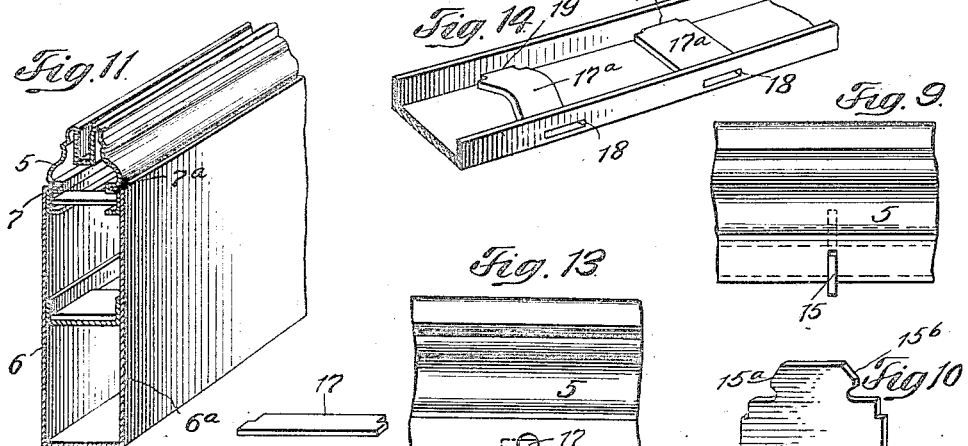

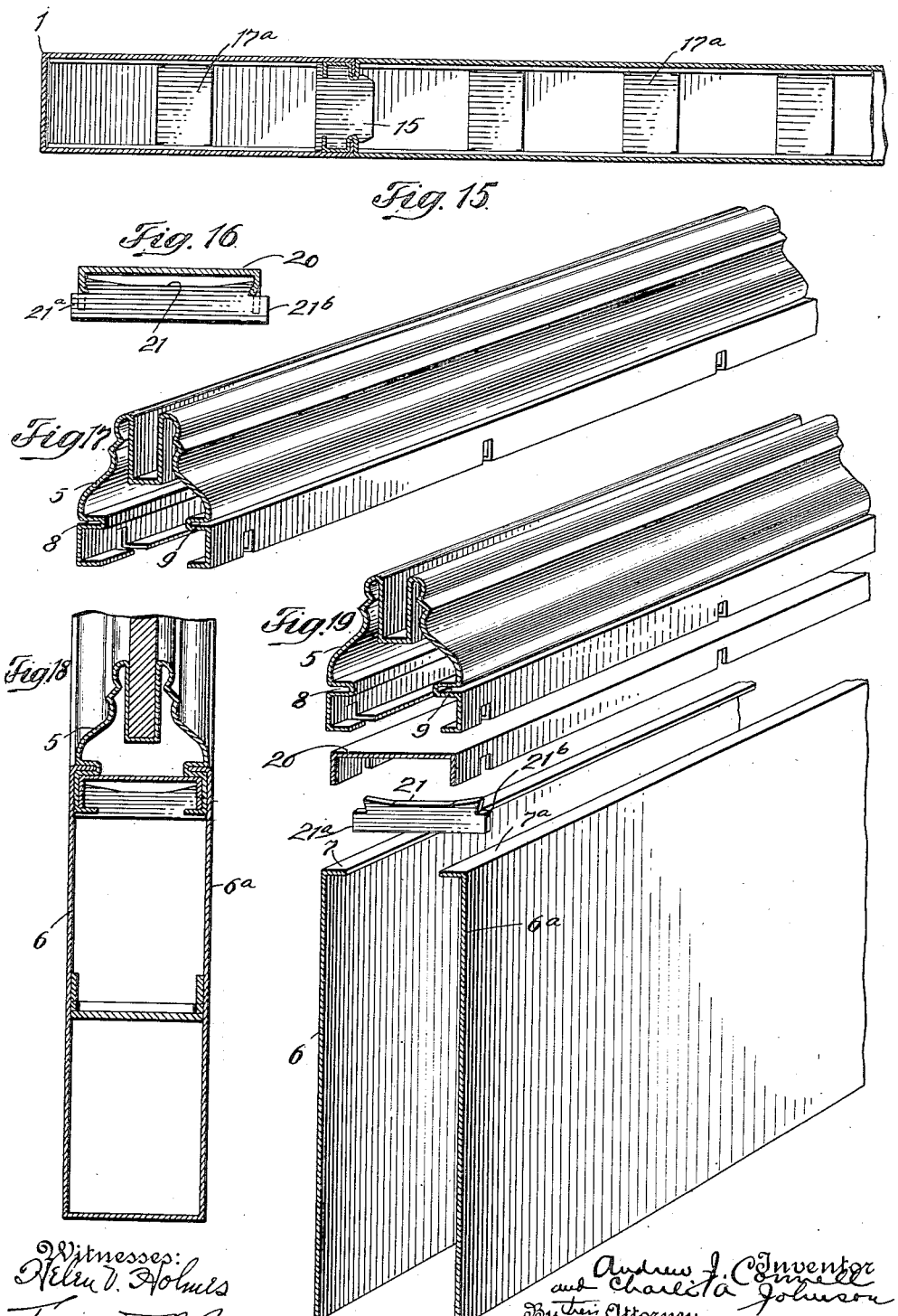

UNITED STATES PATENT OFFICE.

ANDREW J. CONNELL AND CHARLI A. JOHNSON, OF COLLEGE POINT, NEW YORK, ASSIGNORS TO EMPIRE ART METAL CO., INC., A CORPORATION OF NEW YORK.

DOOR AND LIKE METALLIC STRUCTURE.

1,287,888.  Specification of Letters Patent.  Patented Dec. 17, 1918.

Application filed January 12, 1915. Serial No. 1,764.

*To all whom it may concern:*

Be it known that we, ANDREW J. CONNELL and CHARLI A. JOHNSON, citizens of the United States, and residents of College Point, Long Island, in the State of New York, have invented certain new and useful Improvements in Doors and like Metallic Structures, of which the following is a specification.
This invention relates to improvements in doors and like metallic structures.

By the use of our invention we are enabled to readily and quickly weld together a plurality of hollow members having spaced walls and provided with inter-engaging portions so that the resulting sheet metal structure will be extremely rigid and durable; the abutting members will be firmly connected and keyed together and the structure may be so constructed with great rapidity by unskilled labor and at a greatly reduced cost.

In the preferred embodiment of our invention illustrated in the accompanying drawings each abutting stile or rail member is formed of two parallel spaced side plates of sheet metal; the opposing longitudinal or marginal edges of such plates are provided with inter-engaging contacting portions, and the inner inter-engaging portions are provided with a series of pairs of oppositely disposed notches, recesses or apertures and a current-conducting element or welding key fitting within and extending between the walls of the said inner member and having contact points extending through such notches, recesses or apertures into contact with the inner surfaces or walls of the outer member, whereby a welding union is procured between the welding element and the outer and inner members. The most effective union, however, being formed between the said welding element or key and the outer member, the inner member being keyed or retained in place because of the aforesaid welding union between the welding element or key and the outer member.

In the accompanying drawings in which similar reference characters designate corresponding parts throughout the several views, Figure 1 is a side elevation of a portion of a door embodying our invention;

Fig. 2 is an enlarged section on the line 2—2 of Fig. 1;

Fig. 3 is another enlarged section on the line 3—3 of Fig. 1;

Fig. 4 is a perspective view of a molding member keying element and stile or rail member before the same are assembled.

Fig. 5 is a side elevation of the door embodying a modified form of our invention;

Fig. 6 is a section on the line 6—6 of Fig. 5;

Fig. 7 is a section on the line 7—7 of Fig. 5;

Fig. 8 is a section on the line 8—8 of Fig. 5;

Fig. 9 is a side elevation of a molding member removed from the stile member and having the welding element shown in Figs. 6 and 7 within the same;

Fig. 10 is a detail view of the welding element shown in Figs. 6 to 9.

Fig. 11 is a perspective view of another modified form of our invention;

Fig. 12 is a detail view of the keying element shown in Fig. 11;

Fig. 13 is a side elevation of the molding member removed from contact with the stile member and having the welding element shown in Figs. 11 and 12 in place within the same;

Fig. 14 is a perspective view of our preferred means for securing the channel bars within the stile or rail members.

Fig. 15 is an enlarged sectional view on the line 8—8 of Fig. 5;

Fig. 16 is a detail view of another modified form of our invention embodying a separate retaining element for the welding elements;

Fig. 17 is a perspective view of a molding member having notches adapted to receive the said welding and retaining elements illustrated in Fig. 16;

Fig. 18 is a sectional view of a door showing the stile member, molding member and the stiffening channel all welded together by a welding element;

Fig. 19 illustrates in perspective portions of the molding member, stiffening channel and stile member together with the welding element before the same are assembled.

Fig. 20 is a view in perspective of portions of a molding member, welding element and stile or rail member similar to that shown in Fig. 4 but containing a slight modification.

Referring now particularly to Figs. 1 to

4 of these drawings which for the purpose of illustration show our invention applied to a door, though it is adapted for use in metallic partitions and other metallic structures, 1 and 2 indicate stiles of the door, 3 the top rail, 4 the center rail and 5 the panel bracket or molding members. The stiles and rails as illustrated are each formed of parallel spaced side plates of sheet metal designated 6 and 6ª respectively, the top and bottom rails and the stiles being preferably formed with integral edge plates 6ᵇ and being open at one longitudinal edge so as to be substantially U-shaped in cross-section as illustrated in Fig. 4. Each of the parallel spaced plates of the stiles and rails are, as shown, provided along their free longitudinal edges with oppositely disposed straight or flat flanges 7 and 7ª extending inwardly from such plates at a right angle thereto. Contiguous to the longitudinal edges of the panel brackets and also contiguous to the transverse edges 3ª—4ª of the rail members these members have grooves 8—9 which form seats for the opposing inwardly extending flanges and the extreme edges of such members are preferably bent to form L-shaped portions 10 and 11, the vertical legs 10ª—11ª of such L-shaped portions abutting against and fitting within the opposing parallel arranged side plates, and the other legs 10ᵇ and 11ᵇ extending inwardly therefrom and at right angles thereto so as to form a seat for a combined bracing and welding key or element 12.

As shown, a portion of such L-shaped flanges are cut away at points directly opposite to each other to form notches 13 to permit a direct welding contact between projections 12ª of the welding key or element 12 and the inner surface of the outer member.

In assembling the parts the welding element is slid longitudinally within the panel bracket or molding member so that the projections 12ª extend beyond both the outer and parallel walls thereof. The inwardly extending flanges of the outer member are than sprung into the slots in the inner member and the terminals of a welding machine are applied so as to register with these projections. We have found that by this expedient we are not only enabled to procure a direct contact which will localize the heat to effect a strong welding union, but such union will also extend to the inner member. In any event the inner member is by the inwardly extending flanges firmly keyed in position.

Referring now to Figs. 5 to 10 which illustrate a modified form of our invention, the elements are in all respects similar to those described in Figs. 1 to 4 except that instead of the longitudinally extending welding key a series of notches 13 in the inner member are provided and a plurality of transversely disposed welding elements 15 have portions extending through such notches and are retained in position by means of shoulders 15ª and 15ᵇ adapted to frictionally engage the inner surfaces of the grooves 8 and 9.

In Figs. 11 to 13 we have shown another modified form of our invention which instead of having the notches, a series of holes or apertures 16 are drilled through the wall of the inner member and a series of welding elements having portions extending through opposing holes are employed.

In Fig. 14 we have shown how a series of such welding elements may be conveniently employed to retain a stiffening channel in position, said figure showing a series of notches 18 and 19, with a welding element 17ª having portions extending through the opposing members of a pair of notches and also illustrating how the welding element may be seated in the stiffening channel preparatory to the welding operation, one of such elements being shown as bent so that its length is shortened and then subsequently hammered down, so that its reduced portions will extend through the notches.

In Figs. 16 to 19 we have shown another modified form of our invention in which a combined stiffening and retaining channel 20 for a series of welding elements 21 is employed and in this case the two inner members such as the stiffening and retaining channel and the molding member are provided with pairs of registering notches through which reduced portions 21ª and 21ᵇ of welding elements extend to provide contact points with the inner surface of the outer members.

In Fig. 20 which illustrates slight modifications, we have shown our preferred method of forming the projections 12 which consists of depressing holes 12ᵇ contiguous to the point it is desired to have a projection and applying pressure downwardly. This results in the bulging out of the metal to form the projections 12 illustrated in said Fig. 20. In said figure, we have also shown a retaining channel for the welding element 12 without notches. We have found that if the element 12 is fitted within the channel and the metal is hammered contiguous to the projections to cause a slight bulge in the outer surface of the channel, a good electrical contact may be procured.

Having described our invention, we claim:
1. A sheet metal structure comprising a plurality of imperforate sheet-metal plates suitably spaced apart and assembled in substantially parallel relation, a flat metallic current-conducting element arranged intermediate said plates and provided with heat-localizing projections extending outwardly beyond the opposite edges of said element and abutting against the inner surfaces of said spaced, parallel plates and a welded connection between the opposite edge portions of said current-conducting element and the said inner surfaces of said spaced, parallel plates.

2. A sheet metal structure comprising outer and inner interengaging members, the outer member having oppositely-disposed and spaced imperforate walls, and the inner member also having oppositely-disposed and spaced walls having interengaging portions abutting against the inner surfaces of the walls of the outer member, a flat metallic-current-conducting element disposed between the opposite walls of the said members and having heat-localizing edge-projections extending outwardly beyond the opposite edges of said element abutting at opposite sides against the inner surfaces of the opposite walls of one of said interengaging members, and an electric-welded connection between the said opposite edge portions of said current-conducting element and the inner surfaces of the oppositely disposed walls against which it abuts.

3. A sheet metal structure comprising outer and inner interengaging members, the outer member having oppositely-disposed and spaced imperforate walls, and the inner member also having oppositely-disposed and spaced walls having interengaging portions abutting against the inner surfaces of the walls of the outer member, a flat metallic longitudinally-extending current-conducting element disposed between the opposite walls of said members and having at opposite side edges series of projections abutting against the inner surfaces of the opposite walls of one of said interengaging members, and an electric welded connection between the said opposite edge portions of said current-conducting element and the inner surfaces of the oppositely disposed walls against which it abuts.

4. A sheet metal structure comprising outer and inner interengaging members, the outer member having oppositely-disposed and spaced imperforate walls, and the inner member also having oppositely-disposed and spaced walls having interengaging portions abutting against the inner surfaces of the walls of the outer member, and also having oppositely-arranged recesses in said opposite walls, a flat metallic current-conducting element disposed between the opposite walls of said inner member and having edge projections extending through such recesses and into contact with the imperforate walls of the outer member, and a welded connection between the said projections and the inner surfaces of said imperforate walls of the said outer member.

In witness whereof, we have signed our names to the foregoing specification in the presence of two subscribing witnesses.

ANDREW J. CONNELL.
CHARLI A. JOHNSON.

Witnesses:
JACOB COHEN,
W. C. LANGE.